Figure 1:
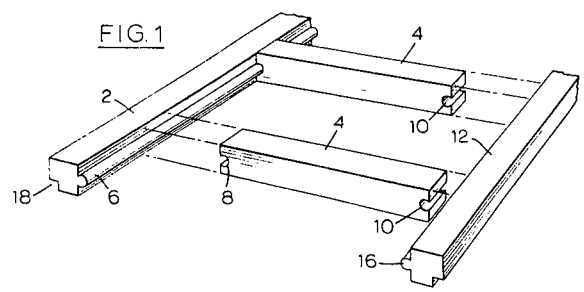

United States Patent [19]

Osterried

[11] 4,080,742
[45] Mar. 28, 1978

[54] KIT OF PARTS FOR FORMING A CURVED MEMBER, AND CURVED MEMBER FORMED THEREBY

[76] Inventor: James L. Osterried, P.O. Box 178, Pense, Saskatchewan, Canada

[21] Appl. No.: 642,428

[22] Filed: Dec. 19, 1975

Related U.S. Application Data

[63] Continuation-in-part of Ser. No. 533,777, Dec. 18, 1974, abandoned.

[30] Foreign Application Priority Data

Nov. 4, 1974 Canada .................................. 212931

[51] Int. Cl.² ..................... B43L 13/22; G01B 3/14; A63H 33/10
[52] U.S. Cl. .................................. 33/177; 33/174 G; 46/29
[58] Field of Search .................... 33/1 G, 41 E, 41 R, 33/174 G, 175, 176, 177; 46/1 K, 28, 29; 24/73 CC, 81 CC; 174/68 C, 72 A; 248/49, 54 R, 60, 63, 68 R; 428/33; 238/10 E

[56] References Cited

U.S. PATENT DOCUMENTS

| 68,487 | 9/1867 | Cassidey | 33/177 |
|---|---|---|---|
| 386,869 | 7/1888 | Donahue et al. | 33/176 |
| 1,079,983 | 12/1913 | Hegardt | 33/177 |
| 1,313,482 | 8/1919 | Hegardt | 33/177 |
| 2,028,401 | 1/1936 | Lore | 238/10 E |
| 2,533,588 | 12/1950 | Kondor | 33/174 G |
| 3,043,902 | 7/1962 | Klein | 24/81 CC |
| 3,107,434 | 10/1963 | Niel | 33/177 |
| 3,134,176 | 5/1964 | Hoyle | 33/177 |
| 3,403,220 | 9/1968 | Riedel et al. | 174/72 A |
| 3,598,349 | 8/1971 | Drake | 174/68 C |
| 3,761,603 | 9/1973 | Hays et al. | 174/72 A |

FOREIGN PATENT DOCUMENTS

| 1,168,929 | 9/1958 | France | 33/177 |
|---|---|---|---|
| 1,311,393 | 10/1962 | France | 248/68 R |

*Primary Examiner*—Richard E. Aegerter
*Assistant Examiner*—Richard R. Stearns
*Attorney, Agent, or Firm*—Beveridge, DeGrandi, Kline & Lunsford

[57] ABSTRACT

A kit of parts for forming a curved member, and a curved member formed thereby, such curved member being capable of defining curved lines and surfaces and for example serving as a curved ruler, or as a structural member which may be combined with similar curved members to define curved surfaces. The kit of parts comprises a pair of elongated, usually identical strips of extrudable shape and flexible in at least one plane, and a plurality of separate, identical connectors each of the connectors being integrally formed of a single piece of material and each having two spaced apart, identically shaped, joint means both capable of directly engaging with a respective strip at any desired location along the strip. The joint means are such as to hold the strips in spaced, parallel disposition while accommodating various curvatures of the strips, and are such as to hold the strips frictionally against longitudinal movement relative to the connectors and are also such as to hold the connectors substantially perpendicularly to the strips. The connectors are spaced apart at regular intervals between the two strips, and once connected thereto hold the strips to the desired curvature. Both the strips and connectors are preferably formed of plastics.

10 Claims, 30 Drawing Figures

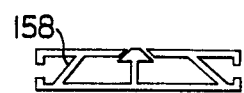
FIG. 9a
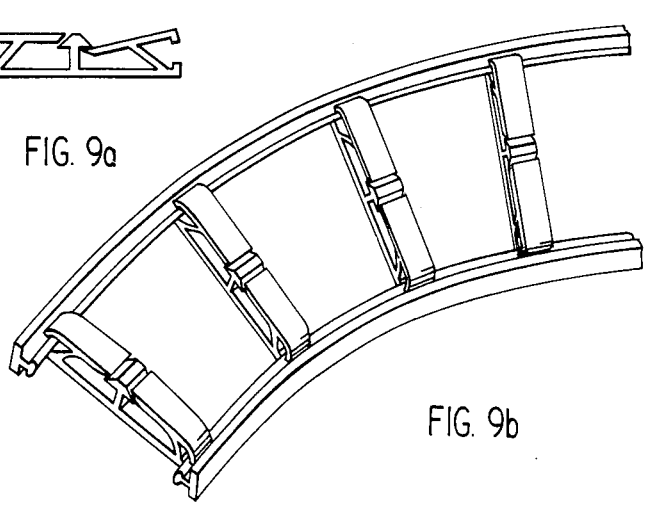
FIG. 9b
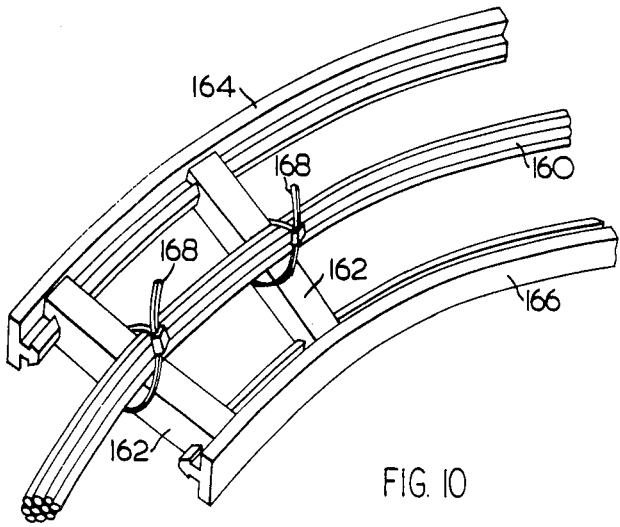
FIG. 10

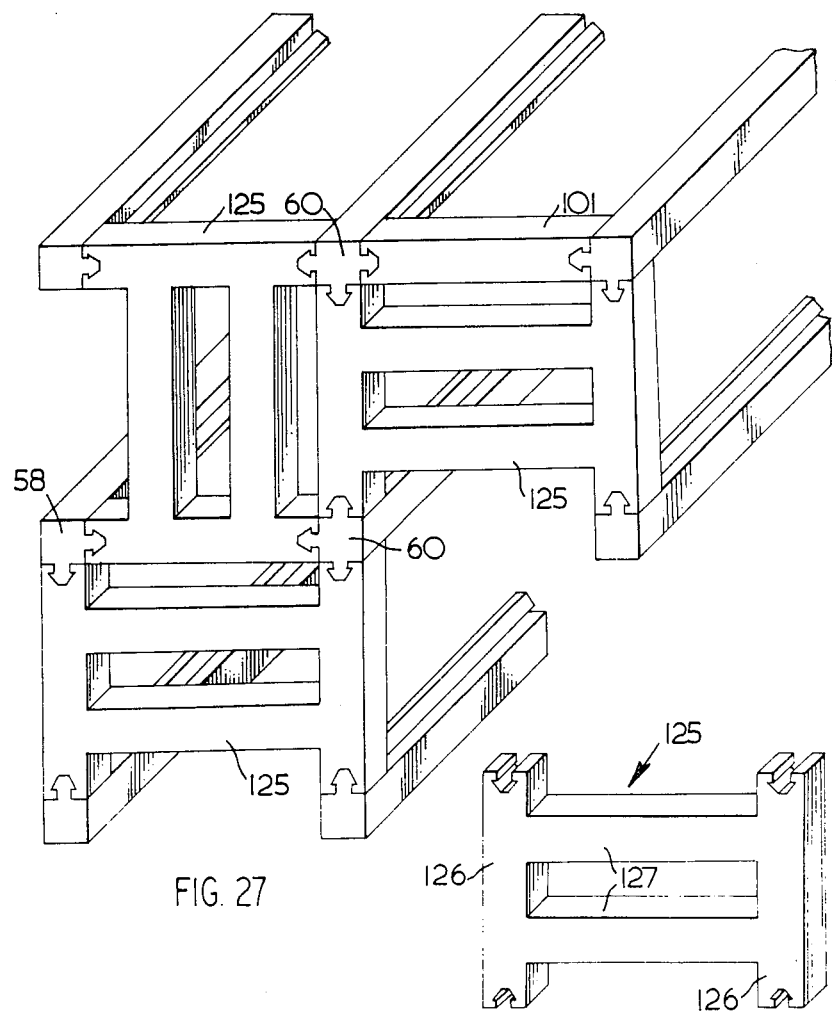

KIT OF PARTS FOR FORMING A CURVED MEMBER, AND CURVED MEMBER FORMED THEREBY

This application is a continuation-in-part of my United States application Ser. No. 533,777, now abandoned, filed Dec. 18, 1974.

This invention relates to a kit of parts for forming curved members, and to the curved members formed thereby, these members being suitable for performing a wide variety of functions. For example, the curved member may be a graphic design instrument, either used for drawing curved lines, or for representing curved lines for example in a three dimensional model. The curved member may also be used as a structural member, along with other similar curved members, for defining a curved surface intended to be covered with a sheeting material. Furthermore, the curved members may constitute part of a constructional toy. A particularly useful function of the curved members is as a vehicle track, especially for toy vehicles, and such a track can be combined with other parts to form an interesting constructional toy; this aspect of the invention is the subject of my U.S. application Ser. No. 622,777, filed Oct. 10, 1975.

At present, where a designer wishes to design a structure with curved surfaces, this is usually laid out on paper using devices such as a compass or a "French curve", to approximate the desired shape. Flexible rulers are also known for drawing or copying curved lines, but standard rulers of this type are often insufficiently rigid to maintain a desired curvature, or of rather complicated construction. Such rulers are shown for example in the following U.S. Pat. Nos. — 386,869 issued July 31, 1888 to Donahue and Bradley; 940,118 issued Nov. 16, 1909 to Bartels; 1,079,983 issued Dec. 2, 1913 to Hegardt; 1,313,482 issued Aug. 19, 1919 also to Hegardt; 3,107,434 issued Oct. 22, 1963 to Niel, and 3,134,176 issued May 26, 1974 to Hoyle.

In addition U.S. Pat. No. 68,487 to Cassidey, issued Sept. 3, 1867, and U.S. Pat. No. 526,900 to Henley, issued Oct. 2, 1894, are also relevant in showing design instruments for use in determining the shape of a ship's hull.

The expense incurred with the complicated constructions shown in these patents may not be of great importance if only a single relatively short ruler is considered, but is nevertheless a limiting factor preventing the use of such constructions for example where it is required to construct a model using a relatively large number of curved members, as will be described below. One factor which makes the known constructions expensive is the common use of a strip member to which is attached a series of projections, which may be bolted to or integrally molded with the strip member, thus preventing this strip member from being produced cheaply for example by known extrusion or rolling processes. The patents to Donahue, Bartels, Hegardt and Cassidey, are typical in this regard. The patent to Henley shows the use of strip members which are standard metal bands, so that this drawback is avoided, but Henley uses very complicated connectors between the bands having screw operated clamps, which again would make his construction prohibitively expensive if a designer wished to lay out a whole surface formed from a large number of such curved members.

The present invention provides a kit of parts which can be formed into a curved member having any desired curvature (down to a certain minimum radius), and which has very great versatality of application, is easy to use and very inexpensive to manufacture. With the use of a kit of parts of this invention, a designer can inexpensively form a whole series of curved members for a model, or a display device, or for defining a large curved surface.

In accordance with one aspect of the present invention, a kit of parts for forming a curved member comprises a pair of elongated strips of extrudable shape and flexible in at least one plane, and a plurality of separate, identical connectors each integrally formed of a single piece of material and each having two spaced apart, identically shaped joint means both capable of directly engaging with a respective strip at any desired location along the strip to hold said strips in spaced parallel disposition while accommodating various curvatures of the strips, the joint means being such as to hold the strips frictionally against longitudinal movement relative to the connectors and also being such as to hold the connectors at substantially constant angles (normally right angles) to the strips. Once positioned along the pair of strips, the connectors maintain the desired curvature of the curved member formed thereby.

The term "extrudable", as applied to the shape of the strips, means that these have no lateral projections and are capable of being formed by extrusion. This does not of course imply that the strips have to be extruded, and for example they could be formed by rolling, in the case of metal strips.

Preferably, the joint means, and the opposed normally upper and lower surfaces of the connectors are defined by extrudable surfaces, so that the connectors also are producible by a procedure including extrusion.

Usually, the joint means engage with the strips as a snap-in tongue and groove fit, the tongue being under cut, and the groove being corresponding shaped.

Both strips and connectors are preferably formed of plastics material. The strips are formed by extrusion, and the connectors may also be formed by extruding a strip having its cross section the same as the longitudinal section of the desired connector, the strip being cut transversely, after extrusion, to form the individual connectors. The connectors may also be formed by injection molding. The parts could however be formed of metal, for example of extruded aluminum.

The parts would normally be sold separately for fitting together by the user after such user has bent the strips to the desired curvature, and the joint means are such that the connectors can easily be snapped into place on the strips, either by hand or using simple tools. Thus, the parts necessary for forming the curved members can be produced very simply, and no hand assembly is required until the parts are to be used by the designer.

Figure 3:
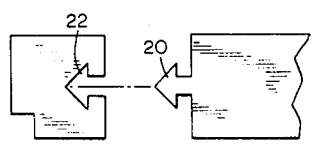
Figure 4:
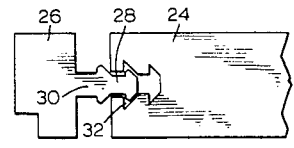
Figure 2:
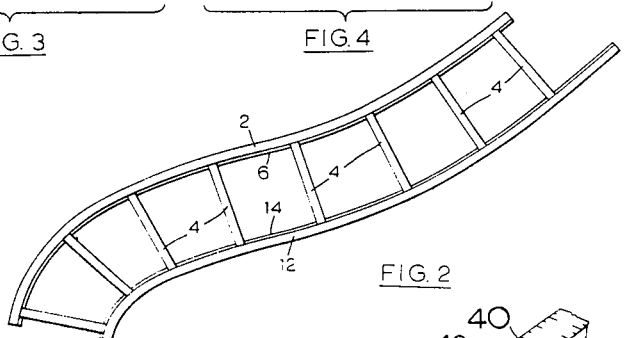
Figure 5:
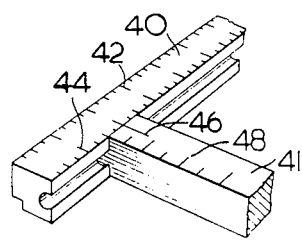
Figure 6:
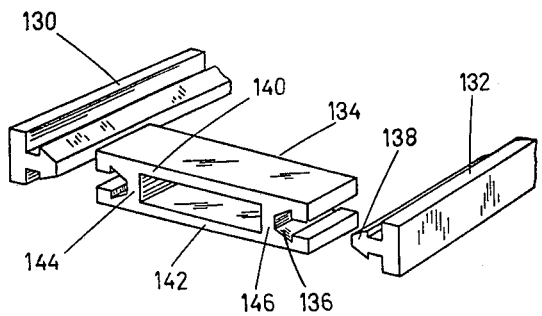
Figure 7:
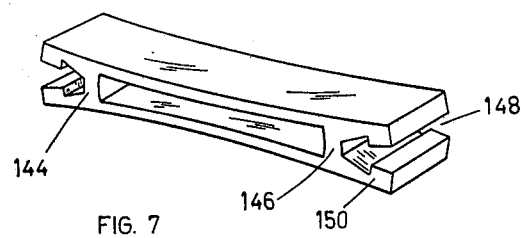
Figure 8:
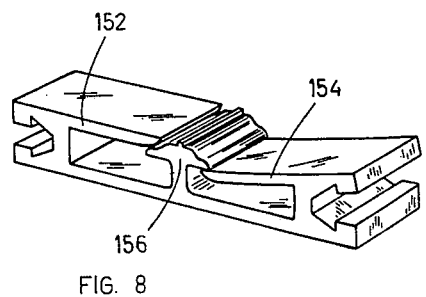
Figure 11:
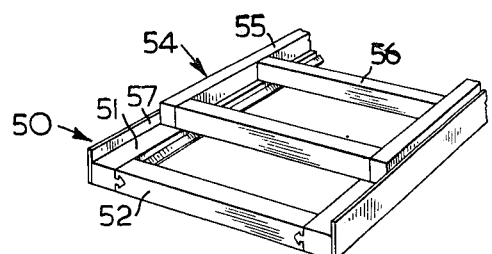
Figure 12:
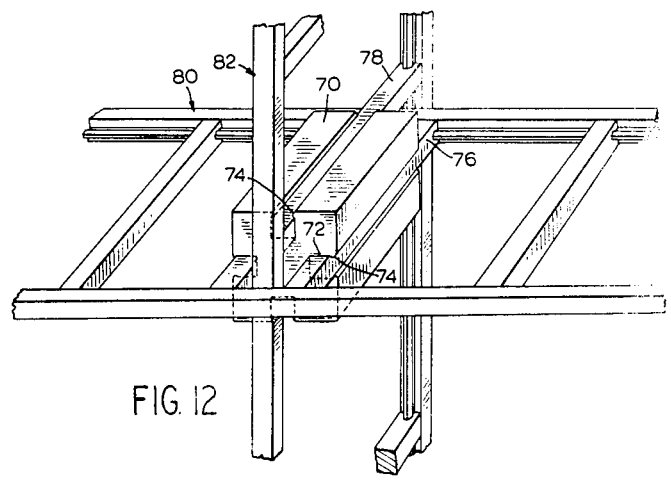
Figure 14:
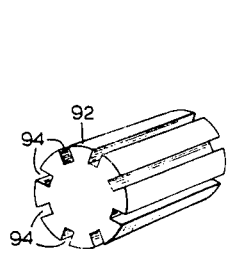
Figure 13:
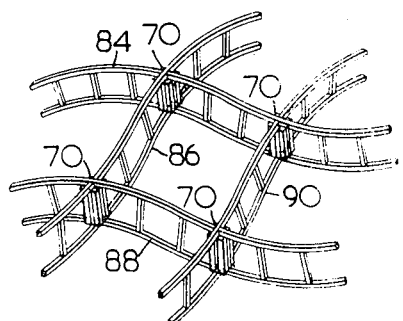
Figure 15:
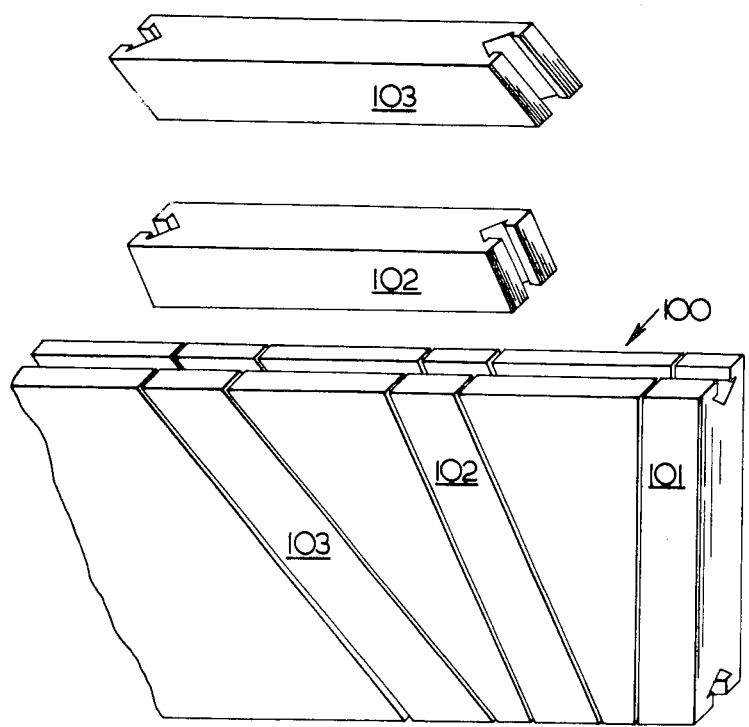
Figure 16:
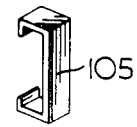
Figure 17:
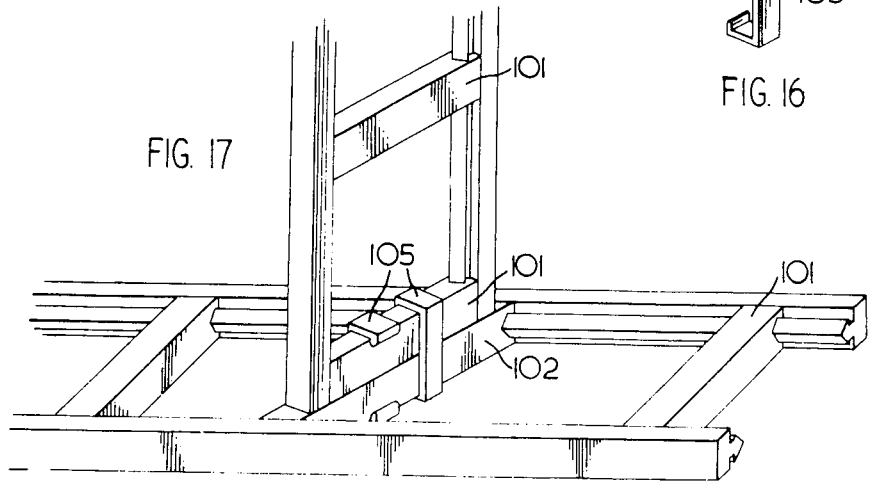
Figure 18:
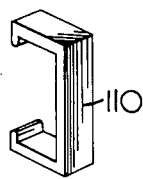
Figure 19:
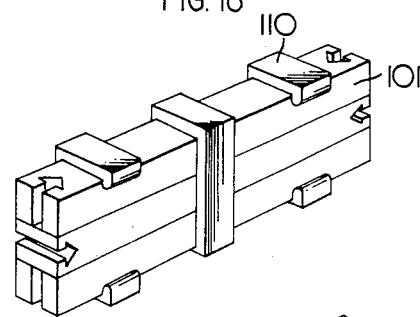
Figure 21:
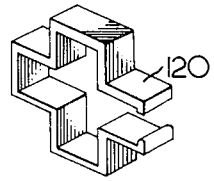
Figure 20:
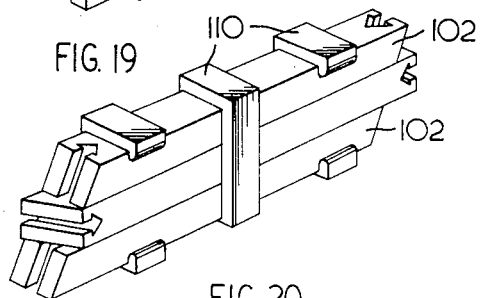
Figure 22:
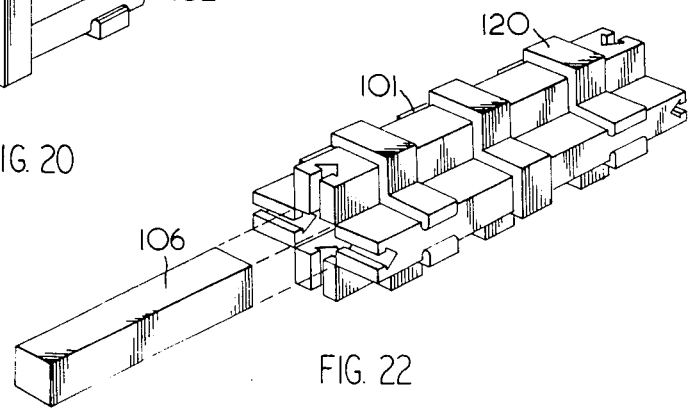
Figure 23:
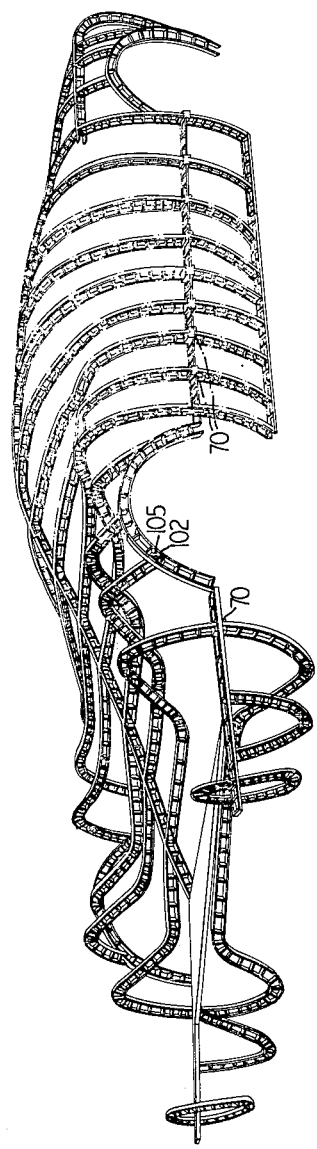
Figure 24:
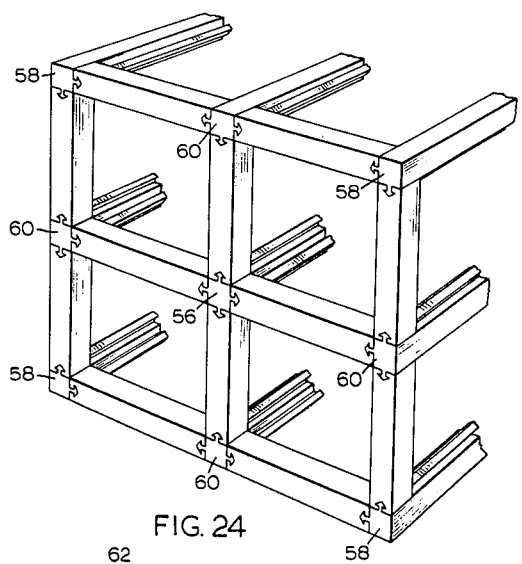
Figure 25:
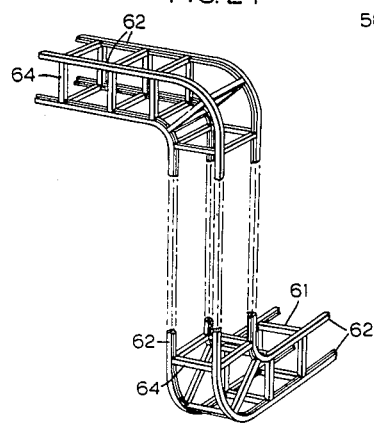
Figure 28:
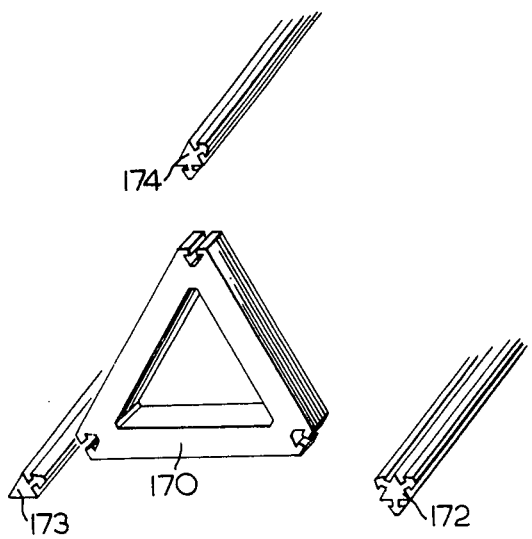

Preferred embodiments of the present invention will now be described with reference to the accompanying drawings, in which:

FIG. 1 is a perspective view of a disassembled portion of a ruling instrument in accordance with this invention, FIG. 2 is a plan view of an assembled ruling instrument of the type illustrated in FIG. 1, FIG. 3 is a cross section of a modified version of a portion of the invention illustrated in FIG. 1, FIG. 4 is a cross section showing a further modification of the invention as illustrated in FIG. 1, FIG. 5 shows a further modification of the ruling instrument as illustrated in FIG. 1, FIG. 6 shows a modified construction including strips and connectors, FIG. 7 shows a connector of FIG. 6 ready for accepting the strips, FIG. 8 shows a modified connector, FIG. 9a shows a further modified connector, and FIG. 9b shows the use of this modified connector in a curved ruler, FIG. 10 is a perspective view of a curved member used for supporting electrical cables, FIG. 11 is a perspective view of a curved member used as a jig or template, FIG. 12 shows a perspective view of portions of two curved members in accordance with the present invention, joined together by special connecting elements, FIG. 13 shows a perspective view of a portion of a structure formed using the elements of FIG. 12, FIG. 14 shows an alternative connector element for connecting several curved members, FIG. 15 illustrates special angled connectors and their formation, FIG. 16 shows a clamp for joining connectors, FIG. 17 shows a perspective view of a joint using the elements of FIGS. 15 and 16, FIG. 18 shows another form of clamp for connectors, FIGS. 19 and 20 show examples of the use of the clamp of FIG. 18, FIG. 21 shows a further form of clamp, FIG. 22 shows an example of the use of the clamp of FIG. 21, FIG. 23 shows a perspective view of the skeleton of a mock-up of a sports car body, using the elements shown in FIGS. 12, 15 and 16, FIG. 24 illustrates a connector arrangement using a plurality of connectors to form a three dimensional column, FIG. 25 illustrates a modification of the curved member which is curved in two planes, FIG. 26 illustrates a connector useful in forming a three-dimensional column, FIG. 27 shows a column structure using the connectors of FIG. 26, FIG. 28 shows elements suitable for forming a triangular column structure.

Figure 29:
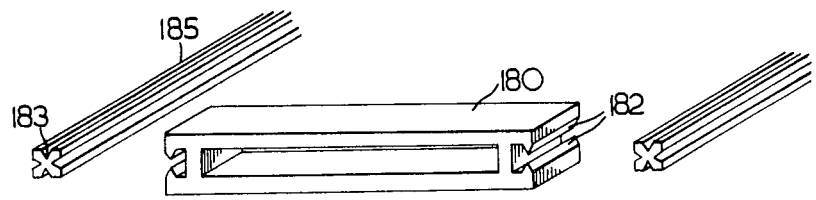
Figure 30:
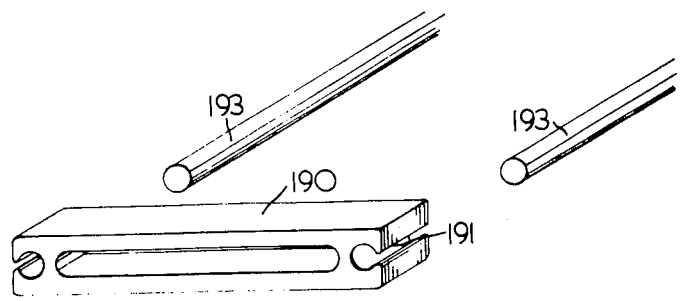

FIGS. 29 and 30 show further types of elements useful for forming column structures.

A drafting instrument incorporating one embodiment of the invention is illustrated in FIG. 1, this instrument being adapted for duplicating or drawing curves on a flat surface such as a sheet of paper. The instrument shown has a first elongated strip 2 which is flexible in at least one plane of the paper. Strip 2 is of extrudable shape, and is preferably formed of plastics material such as nylon or ABS (acrylonitrile-butadiene-styrene).

Attached to and radiating from the first flexible strip are a number of radial connectors 4, which will hereinafter be referred to as "radials". The radials are attached to the strip by means of a tongue portion 6 running along one side of strip 2 and adapted to fit within joint means constituted by a correspondingly shaped groove portion 8 in the end of the radials. An identical groove 10 is provided in the opposite end of each of the radials which allows this second end of the radials to be attached to a second flexible strip 12. Strip 12 is identical to strip 2 but is turned end to end so as to be of opposite hand, and this strip has a tongue 16 fitting into the grooves 10.

It will be seen that the tongues 6 and 16 are undercut, the grooves 8 and 10 being correspondingly shaped, so that these parts fit together as a snap-in fit. The connection is such that the parts can be snapped together by manual pressure, and the radials are frictionally held against longitudinal movement relative to the strips, and are also held substantially at right angles to the strips, so that the strips are in spaced, parallel disposition as illustrated in FIG. 2. The term "parallel" of course merely implies that these strips are equally spaced along their length and does not imply straightness. The width of the radials, which is the same as the length of the grooves 8 and 10, is of course sufficiently small not to interfere with the kind of curvature desired in the strips 2 and 12, while being sufficiently large to hold the connectors substantially at right angles to the strips. The rigidity of the assembled parts is dependent on the resistance to movement of the connectors from the perpendicular disposition relative to the strips, but it is found that once a suitable number of connectors have been snapped into place, at a spacing roughly equivalent to their length, the whole structure is surprisingly rigid and quite rigid enough for the intended purpose of drawing lines. In a sample device, connectors were made with an overall length of 2.5 centimeters, and with a width of 0.5 centimeters, and where spaced along strips having an overall width of about 0.4 centimeters in the manner illustrated in FIG. 2, and these dimensions provided a device sufficiently rigid for drawing or copying lines.

It may be noted that when the kit of parts is assembled as shown in FIG. 2, the axes of adjacent radials, if extended, would meet at the mean center of curvature of the segment of the curve between the radials.

Preferably, the device is assembled by firstly snapping the radials on to a first strip while this is held relatively straight. The strip with the radials is then curved to a desired curvature, and the second strip is then snapped into place. If it is desired to produce a fairly large number of curved members, for purposes which will be described, then the assembly is facilitated by holding the first strip in a simple jig and using a pair of channel lock pliers to snap the radials into place. Also, the curvature desired can be et out on a board with a series of nails, and the strip with the radials attached can be held to the curvature of the nails while the second strip is snapped into place.

The embodiment shown in FIG. 1 has a recess 18 cut out of each outer lower edge of the strips, to allow the instrument to be used for ruling ink lines without smearing the ink. Where the device is to be used for other purposes, described below, this recess of course can be eliminated, the parts otherwise remaining the same.

FIG. 3 shows an alternative configuration for the joint means between the radials and the strip. In this arrangement the radial is provided with a projecting tongue 20, which is of undercut, arrow head configuration and which fits into a correspondingly shaped groove in the strip. This arrangement provides firm resistance to withdrawal of the radial.

FIG. 4 shows a further modification in which the tongue and groove have a double set of notches and ridges. FIG. 4 illustrates a first position of insertion, in which the forward portion 28 of the tongue is inserted into the first recess 32 of the groove. In this position, the radial is held to the strip but is easily adjustable along the strip, only slight friction being provided. When the user wishes to lock the radial in its adjusted position it is only necessary to push the tongue deeper into the recess so that portion 28 reaches the bottom of the groove.

FIG. 5 shows a portion of a modified drafting instrument having distance markings on the radials and strips. As shown, the flexible strip 40 has a series of markings 42 along its ruling edge which may be increments and fractional increments of inches or centimetres or the like, or logarithmic increments. Also, for the purpose of drawing lines parallel to each other, the radials 41 have markings 48 showing the distance of points from the outer edge of strip 40.

Furthermore since an instrument of this nature is useful for drawing or reconstructing curves it may be useful to be able to define a curve in terms of its radius of curvature. This may be facilitated by providing markings on the attaching face or adjacent thereto as illustrated at 44 and by having corresponding markings along or adjacent the attaching face of the second strip. The radials each have a pointer 46 to indicate its relative position along the scale of the flexible strips. For any given segment of the ruling strip the curvature may be defined in terms of the mean radius of curvature for that segment which will be a measure of the spacing between the radials.

More precisely the radius of curvature is a measure of the difference in spacing between the respective ends of a given pair of radials. For instance if "S" is the spacing between radials along the ruling strip and "L" is the length along the radials between the ruling strip and the second strip, and "P" is the spacing between the ends of the radials along the second strip the mean radius of curvature for that segment between the radials of the ruling strip will be defined by the formula $R = SL/(S-P)$.

Since "L" is constant for any given instrument, the mean radius of curvature for every segment between adjacent radials is a function of S and P. It will be noted that since any smooth mathematical curve may be described in terms of the mean radius of curvature of adjacent segments the increments marked along each strip and pointers of the radials showing their positions facilitates the reproduction of any well defined mathematical curve. This property would be especially useful in building models of computer assisted graphics where each curve of the graphic is already mathematically defined within the computer. A simple sub-routine within the computer could easily transforth the equations used by the computer into the natural equations of the curves. Such equations would use the parameters of arc length and radius of curvature which correspond to the distances S and the term $SL/(S - P)$ respectively.

Radials with markings or pointers would of course be produced by injection molding rather than by extrusion.

FIGS. 6 to 9 show further types of radials which can be used with advantage, particularly for giving easy adjustability of the curve radius.

In FIG. 6, the strips 130 and 132 have tongues 138 of arrow head shape which mate with the similarly shaped grooves in the radials 140. The radials 140 are hollowed out so that the radials include upper and lower portions spaced apart by pillars 144 and 146 adjacent the grooves, and the radial is made of flexible plastics material so that the grooves can be widened by pressing together the upper and lower portions of the radials, as illustrated in FIG. 7. This allows for easier insertion of the tongues into the radial grooves, especially where a tight fit is provided to form a rigid curved member. Also, a construction of this kind is useful where much assembly and disassembly is experienced, since the deformation of the material around the area of the groove and tongue is less than with a standard snap-in fit.

The radial shown in FIG. 8 has somewhat the same advantages of the radial of FIGS. 6 and 7, with an additional advantage in that the grooves at the ends can be independently widened. In this arrangement, two cantilever portions 152 and 154 extend inwardly from the upper part of the pillars which underlie the grooves, and these may be operated individually to widen either of the grooves. In addition, a locking pin 156 is provided which has a relatively thin vertical stem extending upwards from the lower spine and an upper horizontal portion which serves to hold the cantilever portion 152 for instance in its horizontal undepressed position maintaining the corresponding groove in the closed position. On the other hand, it may be used to hold the cantilever portion in the depressed position, as illustrated with the portion 154, where the groove is held in the widened position. The upstanding portion of the member 156 is relatively thin and flexible so that this member can be bent toward one or other of the portions 152, 154. When a portion such as 154 is depressed the sloping, co-acting faces of pin 156 and portion 154 cause bending of pin 156, which snaps back into its central position to hold portion 154 when this is fully depressed. To close the groove, the pin is bent out of the way of portion 154. This embodiment is particularly useful in the drawing instrument, for allowing careful adjustment of curvature, in that the radials can be firmly attached by one groove to one strip, and the other groove left open for careful adjustment of curvature of the strips before the second groove is closed. A modified form of radial similar to that of FIG. 8, but having easier flexibility of the part 158 connecting the upper and lower portions, is shown in FIG. 9a; and a portion of a curved ruler using this radial is shown in FIG. 9b.

FIG. 10 illustrates one use of the instrument in providing a supporting frame work for bundles of electrical wires such as often required in machines and installations involving large numbers of electrical leads. As illustrated in FIG. 10 a bundle of electtrical wires 160 is secured to a series of radials such as 162 which in combination with the elongated strips 164 and 166 form a semi rigid supporting structure. The wires can be attached by use of string or other conventional means or tie wraps of the nature now commonly used and illustrated at 168.

FIG. 11 shows an arrangement in which the curved member provides a jig or template used to make structural pieces of a given shape. As shown, the jig 50 has flexible strips 51 connected by radial elements such as 52 and which may be adjusted to the desired curvature of the structural member to be constructed such as that illustrated at 54 and comprising beams 55 and cross supports 56. The upstanding flanges 57 on the jig, which are part of the flexible strips, will hold the structural member being constructed in the desired curvature while the beams and cross pieces are glued or otherwise fastened together to form a rigid member.

It may be noted that the radials shown in FIGS. 1 to 4, 6 to 9, and 11 all have joint means, and upper and lower surfaces, defined by parallel, extrudable surfaces, so that such radials can be produced by an extrusion process if desired.

The curved member described above can also be used as the basis for producing three dimensional models, or three dimensionally curved surfaces. FIG. 12 illustrates a connecting element 70 which is useful in such constructions, this element having parallel grooves 74 centrally positioned on its four mutually perpendicular faces, each capable of holding (as a tight fit) a radial 76, 78. This can be used for holding together two curved members which cross each other as do the members indicated at 80 and 82 in FIG. 12. In addition, instead of the members crossing each other, the same connecting element can be used to connect an end of a curved member to a central point on a second curved member, so that the surfaces defined by the outer edges of the members are smooth at the crossing points. This arrangement is illustrated in FIG. 13, this showing merely a portion of the kind of structure which can be produced by using a series of parallel curved members spanning a space, joined together by further curved members arranged crosswise. The whole array of curved members can be used to define a complexly curved surface, which may be covered with some suitable sheeting as desired.

FIG. 14 shows a connector element 92 having a cylindrical surface with eight, parallel, equispaced slots for receiving a series of end radials of curved members.

In some structures formed of curved members there is a need for curved members to meet obliquely. This requirement is met by the elements illustrated in FIGS. 15, 16 and 17. FIG. 15 illustrates an extruded strip of plastics material 100, normally used for producing standard radials 101 with end grooves disposed at 90° to their axis, by transverse cuts perpendicular to the strip length. As shown, the same strip 100 can be cut obliquely to form radials 102 or 103, with end grooves respectively 65° and 50° to their axes. FIG. 16 shows a plastic C clamp 105 which can be used to hold together such radials or standard radials, as illustrated in FIG. 17. The elements shown in FIGS. 15 and 16 can also be used for the joints illustrated in FIG. 12 and can also be used to connect a sloping radial 102 or 103 at the end of a curved member to a standard radial on another curved member; in this connection reference is made to FIG. 23.

Angled radials such as radial 102 could of course be used along the whole length of a curved member, so it is not essential that the radials be perpendicular to the strips.

FIG. 18 shows a further plastic clamp 110 similar to clamp 105, but having a wider opening capable of holding three radials. Examples of the use of this clamp are shown in FIGS. 19 and 20, in which standard radials 101, and angled radials 102, are shown connected together to forming connecting elements for three curved members.

FIG. 21 shows a further clip 120 for holding four radials; as shown in FIG. 22 the four radials 101 are held on the four sides of a central, blank radial 106.

One possible use for structures formed of curved members is illustrated in FIG. 23, this showing the skeleton of a mock-up for the body of a sports car. It will be seen that the skeleton is entirely composed of curved members comprising strips and radials, connected together at their crossing points by connectors similar to that shown in FIG. 12 or radials and connectors as shown in FIGS. 15 and 16. This proposed use of the invention illustrates the importance of the inexpensive nature of the parts used in accordance with the invention, since if each of the curved members shown were to be made for example as proposed in the U.S. patents of Cassidey or Henley referred to above, then the project would be prohibitively expensive.

FIGS. 24 to 30 show parts which can be used in the formation of columns which can be three-dimensionally curved, as well as being capable of being combined into complex structures.

FIG. 24 shows a kit of which the radials are generally similar to those of FIG. 1, except that the grooves have an arrow head shaped cross section to mate with similarly shaped tongues on the strip members. FIG. 24 shows the use of three different forms of strip member, each of square cross section, these including member 56 which has four tongues, each centrally placed on one of the faces, strip member 58 which has two tongues on two adjacent faces, and strip member 60 which has three tongues one on each of three faces.

The kit of parts shown in FIG. 24 can be used to build up complicated structures, either for use in displays, or in constructional kits. A special feature of the three dimensional column formed by these parts is that this can be curved in three dimensions, as illustrated in FIG. 25. Thus, FIG. 25 shows the use of four strips similar to those shown at 58 in FIG. 24, i.e. each having two tongues, and spaced so as to form a square array of column.

FIG. 26 shows a special radial 125 for forming column structures, comprising essentially two radials 126 joined by integral connecting members or pillars 127, so that the grooved joint means of the radials are situated at the corners of the square. This radial may form a square column similar to that of FIG. 25, or may be combined with the special strips 56, 58 and 60 of FIG. 17 and regular radials 101 to form complex curved structures as shown in FIG. 27.

FIG. 28 shows a further specially shaped parts for forming triangulated columns, including a triangular radial 170 in the form of an equilateral triangle with outwardly facing grooved joint means at each of the three corners, and special strips 172, 173, and 174. Each strip has the shape of an equilateral triangle and having a tongue or rib projecting from at least one face and engageable with the joint means of the radial. The strips 172, 173 and 174 have respectively one, two, and three ribs.

FIG. 29 shows a radial 180 somewhat similar to that of FIG. 6 in having upper and lower portions capable of being pressed together to widen the slots. The slots in radials 180 however are defined by upper and lower jaw members 182 which have triangular cross sections and which mate with similarly shaped grooves 183 in each of the specially shaped strips 185. The strips 185 have four mutually perpendicular, identical faces, each with a centrally situated groove 183. The arrangement is such that the radials 180 can engage on each strip to extend therefrom in any of four mutually perpendicular directions, so that these parts can be used to form square columns or more complex structures.

FIG. 30 again shows a radial 190 somewhat similar to that of FIG. 6 in having openable grooves 191, but in this case the grooves are circular in cross-section to mate with strips 193 of rod-like form. Thus, the radials can extend in any desired direction from the strip and triangular, square, or polygonal columns can be formed thereby.

I claim:

1. A curved member comprising a pair of elongated strips having a longitudinally constant cross section and flexible in at least one plane, and a plurality of identical connectors, each of said connectors being integrally formed of a single piece of material and having two spaced apart identically shaped grooves, one of said grooves extending across each end portion of the connectors, said grooves being engaged as a snap fit with a tongue portion attached to a respective strip, said grooves of each connector being infinitely adjustable in position along each of said strips to alter the curvature of the member, said grooves being such as to hold the strips frictionally against longitudinal movement relative to the connectors, and being such as to hold the strips at a substantially constant angle to the connectors, whereby the curvature of the member is normally maintained, and wherein said connectors are formed of flexible plastics material and comprise a base member spanning between lower parts of said end portions, and a cantilever member extending inwardly from the upper part of at least one end portion and adapted to spread open the associated groove when said cantilever member is depressed.

2. A curved member according to claim 1 in which said connectors have a locking pin presenting a latch portion co-operating with the end of said cantilever member to hold same in a depressed portion and an undepressed position as selected.

3. A curved member according to claim 2 in which said locking pin is adapted to allow said cantilever member to move between a depressed position and an underpressed position by bending out of the way of said cantilever member.

4. A kit of parts for forming a curved member, comprising a pair of elongated strips having a longitudinally constant cross section and flexible in at least one plane, and a plurality of separate, identical connectors, each of said connectors being integrally formed of a single piece of material and each having two spaced apart, identically shaped, grooves, one of said grooves extending across each end portion of the connectors and each capable of directly engaging with a respective strip at any desired location along the strip to hold said strips in spaced, parallel disposition while accommodating various curvatures of the strips, the grooves being such as to hold the strips frictionally against longitudinal movement relative to the connectors and also being such as to hold the connectors substantially at constant angles to the strips so that once positioned along the pair of strips the connectors maintain the desired curvature of the curved member formed thereby, and wherein said connectors include upper and lower portions spaced apart by pillars adjacent the grooves, whereby said grooves can be widened by pressing together said upper and lower portions.

5. A curved member suitable for use as a graphic design instrument comprising a pair of elongated strips having a longitudinally constant cross section and flexible in at least one plane, and a plurality of identical connectors, each of said connectors being integrally formed of a single piece of material and having two spaced apart identically shaped joint means, said joint means being engaged with a respective strip, said joint means of each connector being infinitely adjustable in position along each of said strips to alter the curvature of the member, said joint means being such as to hold the strips frictionally against longitudinal movement relative to the connectors, and being such as to hold the strips at a substantially constant angle to the connectors, whereby the curvature of the member is normally maintained, and in which said joint means includes means by which said connectors are attachable to said strips in a first position wherein said connectors are easily adjustable along the length of said strip and in a second position wherein said connectors are substantially held in their location on said strip.

6. A curved member comprising a pair of elongated strips having a longitudinally constant cross section and flexible in at least one plane, and a plurality of identical connectors, each of said connectors being integrally formed of a single piece of material and having two spaced apart identically shaped grooves, one of said grooves extending across each end portion of the connectors, said grooves being engaged as a snap fit with a tongue portion attached to a respective strip, said grooves of each connector being infinitely adjustable in position along each of said strips to alter the curvature of the member, said grooves being such as to hold the strips frictionally against longitudinal movement relative to the connectors, and being such as to hold the strips at a substantially constant angle to the connectors, whereby the curvature of the member is normally maintained, and wherein said connectors are formed of flexible plastics material and comprise upper and lower substantially parallel spaced apart portions connected by connecting portions adjacent said grooves, the arrangement permitting widening of said grooves by pressing together said upper and lower portions.

7. A kit of parts for forming a curved member, comprising at least three elongated strips having a longitudinally constant cross section and flexible in at least one plane, and a plurality of separate, identical connectors, each of said connectors being integrally formed of a single piece of material and each having spaced apart, identically shaped, joint means equal in number to said strips, each said joint means being capable of directly engaging with a respective strip at any desired location along the strip to hold said strips in spaced and parallel disposition while accommodating various curvatures of the strips, the joint means being such as to hold the strips frictionally against longitudinal movement relative to the connectors and also being such as to hold the connectors substantially at constant angles to adjacent portions of the strips so that once positioned aong the strips the connectors maintain the desired curvature of the curved member formed thereby, the strips, when held by said connectors, presenting smooth edges on the sides thereof remote from the connectors.

8. A kit of parts according to claim 7 including four strips, and wherein said connectors each have four spaced apart joint means.

9. A curved member comprising at least three elongated strips having a longitudinally constant cross section and flexible in at least one plane, and a plurality of identical connectors, each of said connectors being integrally formed of a single piece of material and having spaced apart identically shaped joint means equal in number to said strips, each joint means being engaged with a respective strips, said joint means of each connector being infinitely adjustable in position along each of said strips to alter the curvature of the member, said joint means being such as to hold the strips frictionally against longitudinal movement relative to the connectors, and being such as to hold the connectors at a substantially constant angle to the adjacent portions of the strips, whereby the curvature of the member is normally maintained, said strips presenting smooth edges on the sides thereof remote from the connectors.

10. A curved member according to claim 9, having four strips, and wherein each connector has four spaced apart joint means.

* * * * *